Patented May 25, 1937

2,081,642

UNITED STATES PATENT OFFICE 2,081,642

INDURATING COMPOSITION FOR CONCRETE

Edward W. Scripture, Jr., Shaker Heights, Ohio

No Drawing. Application February 4, 1936,
Serial No. 62,297

11 Claims. (Cl. 106—27)

This invention relates to the hardening and waterproofing of concrete or mortar, and has for its object to provide an indurating composition which will increase the strength, hardness and waterproofing qualities of concrete, and which will also improve the workability.

This composition is similar to and an improvement on the compositions disclosed in my co-pending applications, Serial Nos. 59,603, filed January 17, 1936, and 751,747, filed November 6, 1934.

It is well known that the properties of concrete are influenced by the amount of water employed in the mix. A certain quantity of water is required in order that the cement, sand, gravel, or other ingredients of the mix can be properly mixed together, so that the material will flow readily and can be worked satisfactorily, but it has been found that the water content of the mix should be kept as low as possible, as the strength and density of the finished concrete is reduced by an increase in the water content.

An object of this invention is to provide means by which a concrete mix having a given degree of fluidity may be made which contains a substantially smaller proportion of water than has heretofore been required to produce concrete mixes of the same fluidity.

Another object of the invention is to provide an improved concrete which can be worked easily and readily, which shrinks but little in hardening, and which, when hardened, is very dense and impermeable.

A further object of the invention is to provide a plasticizing mixture or composition which can be added to a batch of concrete or the like as it is being mixed, or to one of the ingredients before the material is mixed, and which, when so added, will greatly increase the fluidity of the mix without impairing the strength of the concrete.

Other objects and features of the invention will be apparent from the following description.

The plasticity or fluidity of a mix of concrete is greatly increased by the presence of a small quantity of a waste sulphite liquor derived from the manufacture of paper pulp from wood. This waste sulphite liquor may be in the dilute form, as separated from the paper pulp, or may be more or less concentrated by evaporating or driving off part of the water, with or without neutralization of the acid, or may be completely dried to a fine powder.

A considerable number of chemical substances have been found effective for dispersing various finely divided solid materials in water. However, a dispersing agent effective for dispersing materials in one mixture may be relatively ineffective in another mixture. In the case of concrete mixes, a considerable number of substances which have been identified as dispersing agents for certain materials have been added to concrete mixes. Many of these substances, when present in a concrete mix, do not have sufficient dispersing action to affect appreciably the fluidity of the mix, and others have distinctly deleterious effects on the concrete.

Effective dispersion of fine material in concrete mixes may be obtained by the addition of small quantities of waste sulphite liquor, and such liquor or dried residue thereof may be added to concrete mixes in sufficient proportions to very materially increase the workability of the mix and to substantially reduce the amount of water required, without deleterious effects on the concrete. For example, I have found that the addition of 0.15% (based on the weight of the cement) of dried waste sulphite liquor will reduce the quantity of water required for a given consistency in a 1:3 standard mortar by about 10% to 12% and will, at the same time, increase the strength of the hardened mortar, as is shown by the following results of experiments:

*1:3 Standard sand mortar*

|  | With 0.15% dried liquor | Without addition |
|---|---|---|
| Water required for 1100 g. cement in c. c. | 440 | 500 |
| Compressive strength in lbs. per sq. in.: | | |
| 3 days | 1814 | 1654 |
| 7 days | 2958 | 2513 |
| 28 days | 4770 | 4134 |

Larger quantities of the waste liquor will still further decrease the amount of water required to make a workable mortar, but quantities of waste liquor very much in excess of 0.15% of dried residue on the weight of the cement tend to retard the set of the cement and to decrease the rate of development of the strength of the concrete or mortar, so that strengths at 3 and 7 days may be materially reduced, and even the strength at 28 days may be materially decreased. This effect is illustrated by the results of experiments as follows:

*1:3 Standard sand mortar*

|  | With addition of waste sulphite liquor—qts. per sack of cement | | | Without addition |
|---|---|---|---|---|
|  | 1 | 2 | 4 | |
| Water required for 1100 g. cement—c. c. | 450 | 435 | 400 | 500 |
| Compressive strength—lbs. per sq. in.: | | | | |
| 3 days | 1274 | 923 | 0 | 1369 |
| 7 days | 2386 | 2068 | 0 | 2737 |
| 28 days | 4010 | 2386 | 159 | 3565 |

It will be seen that with an addition of 2 quarts the strength is materially impaired, with 4 quarts the strengths at three and seven days are completely destroyed, and at twenty-eight days the strength is very low. But with increasing proportions of waste liquor the amount of water required for a workable mortar is steadily diminished, being a reduction of 10% with 1 quart, 14% with 2 quarts, and 20% with 4 quarts.

I have found that by mixing with or adding to the waste sulphite liquor, in whatever form employed, a reagent which accelerates the set and promotes the rapid development of strength in concrete and mortar, the difficulty involved in the use of large quantities of waste sulphite liquor may be overcome. By adding sufficient accelerating agent to compensate for the retardation produced by the use of more than 0.15% of waste sulphite liquor residue, or its equivalent, the advantage of decreased reduction in water may be secured without the attendant decrease in compressive strength which would otherwise result. This is illustrated by the following example:

*1:3 Standard sand mortar*

|  | With 0.4% dried liquor + 1% calcium chloride | Without addition |
|---|---|---|
| Water required for 1100 g. cement in c. c. | 390 | 500 |
| Compressive strength in lbs. per sq. in.: |  |  |
| 3 days | 1782 | 1527 |
| 7 days | 2768 | 2482 |
| 28 days | 3467 | 3244 |

It will be apparent from the examples given that, whereas with the compositions of my copending applications, Serial Nos. 59,603, filed January 17, 1936 and 751,747, filed November 6, 1934, it is possible to reduce the water required for a workable mortar by about 8% to 12%, with equal or somewhat greater compressive strength than the mortar without the addition, but with further additions of these compositions, which permit greater reductions in water, the compressive strengths are impaired. With the compositions of the present invention it is possible to effect reductions in water as high as or higher than 22% without impairing compressive strength. That is, the composition of the present invention permits a 100% increase in water reduction while maintaining strength.

It is, of course, possible to further increase the rate of development of strength by the use of a larger proportion of accelerating agent.

Many electrolytes have an accelerating effect and are suitable for this purpose. Among them are the chlorides of calcium, aluminum, iron and ammonium, sodium hydroxide, sodium silicate, sodium aluminate and the corresponding potassium salts. There are many other inorganic compounds which will have similar effects, and I do not limit my invention to those named.

While it is to be understood that there may be considerable variations in the proportions desirable for different mixes and for different purposes, and that the property of increasing fluidity is not restricted to the precise percentages herein stated, it has been found, with respect to the waste sulphite liquor, that this material may be added in proportions from 0.15% to 0.5% of the dried residue on the basis of the weight of cement in the mix, and that the accelerating agent combined therewith should be from about 0.5% to 2.5%, depending on the nature of the accelerating agent and on the proportion of waste sulphite liquor used. With the larger proportions of waste liquor the greater quantities of accelerating agent should be used.

The mix is prepared in the usual manner, except for the addition of the waste sulphite liquor and the accelerating agent. The completed mix, because of the presence of the plasticizing agent is much more fluid and flows more readily than a similar mix prepared with the same quantity of water, but without the plasticizing agent. Because of the greater fluidity the mix is more readily workable, is of increased density, and is more cohesive, thereby preventing segregation of aggregates in the mix.

Because of the increase in the fluidity of the mix, which is produced by the plasticizing agent provided by my invention, it is possible to reduce the amount of water employed in a mix and still produce a mix having a satisfactory degree of fluidity, so as to be workable, and this reduction in the amount of water produces a concrete of increased density and impermeability. The use of the accelerating agent provided by my invention insures an increased strength and greater hardness. This invention also makes possible the use of leaner mixtures, that is, mixtures having relatively smaller amounts of cement than usually employed. This results in a substantial saving and produces a concrete which shrinks less than those produced by the mixes now employed, while the concrete is as strong as or stronger than those prepared without the plasticizing agent and accelerator herein disclosed.

I have found that a further advantage of the combination of waste sulphite liquor with an accelerating agent is that the accelerating agent, for example calcium chloride, enhances the plasticizing effect of the waste sulphite liquor. For example, the water required for 1100 g. of cement in a 1:3 standard sand mortar for a workable consistency is ordinarily 500 c. c. With the addition of waste sulphite liquor and calcium chloride the following amounts of water give mixes of equal workability:

| Waste sulphite liquor dried residue as percent of cement | Calcium chloride as percent of cement | Water required for 1100 g. cement in c. c. |
|---|---|---|
| Percent by weight | Percent by weight |  |
| 0.0 | 0.0 | 500 |
| 0.2 | 0.0 | 430 |
| 0.2 | 0.5 | 425 |
| 0.2 | 1.0 | 420 |
| 0.3 | 0.0 | 400 |
| 0.3 | 2.0 | 395 |

It is well known that in concrete made from locally available materials there is frequently a deficiency of fines in the sand so that the most desirable granulometric composition is not secured. Even with sand, which is not deficient in fines, it is often advantageous to add to concrete a small proportion of a non-hydraulic fine material, finer than the usual cement, as this promotes greater density and watertightness by filling and making smaller the capillaries which form in concrete. The addition of a fine pozzuolanic material has the advantages set forth above and, in addition, combines with and fixes the free lime either originally present in the cement or formed by hydrolysis of the silicate compounds of the cement, rendering this lime less soluble, hence less subject to corrosive attack. A disadvantage, however, which has hitherto accompanied such an addition of fines, either inert or pozzuolanic, is that, to secure the same slump, flow or mobility of the concrete it has been necessary to add more water with the fines than would be required in a similar concrete mix without the fines. This has the disadvantage of decreasing the density, watertightness, and strength, and of increasing volume change.

By combining with this fine material a dispersing agent and an accelerating agent, the disadvantage involved in the use of more water in the concrete mix with the fine material is avoided, and the quantity of water required in the mix may be even less than that required in ordinary mixes without the fines. Furthermore, the efficiency of the fine material is enhanced, since its effect depends upon its fineness and its uniform mixing with the concrete, and both of these are improved by the presence of a dispersing agent and an accelerator.

Effective dispersion of such fine materials in concrete may be obtained by the addition of substantial amounts of waste sulphite liquor or the dried residue from waste sulphite liquor, together with a suitable proportion of an accelerating agent, as described above, to compensate for the retardation of hydration of the cement, such as is caused by the use of any considerable proportion of waste sulphite liquor. Furthermore, such a composition of fine materials, waste sulphite liquor and accelerating agent may be added to concrete mixes in very substantial proportions, sufficient to very materially increase the workability of the mix and substantially reduce the amount of water required, without deleterious effects on the concrete. The increase in fluidity makes it possible to add substantial amounts of inert or pozzuolanic, finely divided, non-hydraulic material with a reduction in water content of the mix. The dispersing agent, the accelerating agent, and the fine material may be prepared as a powder mixture to be added in suitable quantities to the ingredients of the concrete mix or as a suspension of the finely divided solids in a solution of the dispersing agent and the accelerating agent.

The composition of the present invention is formed by grinding together to a finely divided state the dried residue of waste sulphite liquor or the more or less concentrated liquor, an accelerating agent, and an inert solid, finely divided, such as precipitator dust, fly ash, talc or the like, or a finely divided non-hydraulic pozzuolanic material, such as bauxite residue, trass, pumice, diatomaceous earth, etc.

The term "inert" as used herein refers to finely divided, solid materials which will not combine with lime to any appreciable extent.

By "pozzuolanic material" is meant a substance which will take up lime from solution, either by chemical combination or adsorption, to form a relatively insoluble combination which has some cementitious value.

By "finely divided solids" is meant any solid substantially insoluble in water, of which all or substantially all will pass a 100 mesh screen.

By "non-hydraulic" is meant a material which does not react with water alone to form cementitious compounds.

One example of a composition embodying the invention is the dry powder mixture obtained by grinding together dried sulphite liquor residue, precipitator dust and calcium chloride in the proportions of two pounds of dried waste sulphite liquor, seven pounds of calcium chloride and fourteen pounds of precipitator dust.

A second example is the dry powder mixture obtained by grinding together dried waste sulphite liquor, calcium chloride and bauxite residue in the proportions of two pounds of dried waste sulphite liquor residue, seven pounds of calcium chloride and fourteen pounds of bauxite residue.

For standard concrete and mortar mixes, the compositions prepared as above described may be added to the cement or to the concrete mix substantially in the proportion of three pounds of the powder composition per sack (94 lbs.) of cement.

It is to be understood that the proportion of the fines to the waste sulphite liquor and to the accelerating agent may be varied as desired, and that a mixture of inert and pozzuolanic materials may be employed, the proportions above given being convenient for practical use.

It will be obvious that other materials may be added to the concrete at the same time, as, for example, colors, stearate waterproofings, etc. These may be added separately to the concrete mix at the time of mixing or might be added to the composition of the present invention prior to the mixing of the concrete. It will also be obvious that the composition of the present invention may be added to the concrete when it is being mixed, or to the water to be used in the mix, or to each sack of cement before the mix is made, or to the cement when it is ground, or, in fact, to any part of the concrete mix prior to completion of the mixing. It will also be obvious that the usual addition of calcium sulphate as a retarder in cement may be omitted and replaced by the composition of the present invention with a somewhat reduced proportion of accelerating agent.

From the foregoing it will be seen that I have provided a plasticizing agent which can readily be added to concrete mixes, and which substantially increases the fluidity and workability of the mix over that of a similar mix prepared without this agent, and even over that of mixes prepared with the compositions of my copending applications, Serial Nos. 751,747 and 59,603.

It will be seen, also, that because of the increased workability produced by the composition of the present invention the quantity of water employed in the mix can be very substantially reduced, even if a considerable proportion of fines is added to the mix, thereby providing a superior concrete, while additional aggregates may be added to the mix without it becoming necessary to increase the water content of the mix, as has heretofore been required. The composition of the present invention is inexpensive and very effective in concrete mixes for the purposes described, and is provided in a form convenient for addition to concrete mixes.

Furthermore, it is to be understood that the particular compounds disclosed, and the procedure set forth, are presented for purposes of explanation and illustration, and that various equivalents can be used and modifications of said procedure can be made without departing from my invention, as defined in the appended claims.

What I claim is:

1. An indurating composition for concrete or mortar, comprising waste sulphite liquor and calcium chloride.

2. An indurating composition for concrete or mortar, comprising a mixture of dried waste sulphite liquor residue and calcium chloride.

3. An indurating composition for concrete or mortar, comprising waste sulphite liquor, in an amount equivalent to .15% to .5% of dry waste sulphite liquor residue by weight of the cement, calcium chloride in an amount of .5% to 2.5% by weight of the cement, and a finely divided non-hydraulic filling material.

4. An indurating composition for concrete or mortar, comprising waste sulphite liquor, calcium chloride, and a finely divided non-hydraulic filling material.

5. An indurating composition for concrete or mortar, comprising waste sulphite liquor, in an amount equivalent to .15% to .5% of dry waste sulphite liquor residue by weight of the cement, calcium chloride in an amount of .5% to 2.5% by weight of the cement, and finely divided pozzuolanic material.

6. An indurating composition for concrete or mortar, comprising waste sulphite liquor, calcium chloride, and finely divided pozzuolanic material.

7. An indurating composition for concrete or mortar, comprising a mixture of dried waste sulphite liquor residue, calcium chloride, and a finely divided non-hydraulic filling material.

8. An indurating composition for concrete or mortar, comprising a mixture of dried waste sulphite liquor residue, calcium chloride, and finely divided pozzuolanic material.

9. The hereindescribed method of increasing the workability of a concrete mix containing water in a given ratio, which comprises incorporating in the mix the solids in waste sulphite liquor equivalent to .15% to .5% of dry waste sulphite liquor residue by weight of the cement and .5% to 2.5% of calcium chloride by weight of the cement.

10. A concrete mix containing waste sulphite liquor in a proportion which greatly increases the workability of the mix with a given amount of water, but which would normally decrease the strength of the concrete, together with an electrolyte which accelerates the setting of the cement and which, in the presence of waste sulphite liquor, increases the strength of the concrete without decreasing the workability of the mix, said electrolyte being one of a group of accelerating agents which includes water soluble metal chlorides.

11. The herein described method of increasing the workability of a concrete mix containing water in a given ratio, which comprises incorporating in the mix the solids in waste sulphite liquor equivalent to .15% to .5% of dry waste sulphite liquor residue by weight of the cement and .5% to 2.5% by weight of the cement of an electrolyte being one of a group of accelerating agents which includes water soluble metal chlorides.

EDWARD W. SCRIPTURE, Jr.